(12) United States Patent
Gordin et al.

(10) Patent No.: US 9,000,934 B1
(45) Date of Patent: Apr. 7, 2015

(54) APPARATUS, METHOD, AND SYSTEM FOR DETERMINING END-OF-LIFE OF A PRODUCT

(75) Inventors: Myron Gordin, Oskaloosa, IA (US); Timothy D. McGill, Pleasantville, IA (US)

(73) Assignee: Musco Corporation, Oskaloosa, IA (US)

( * ) Notice: Subject to any disclaimer, the term of this patent is extended or adjusted under 35 U.S.C. 154(b) by 529 days.

(21) Appl. No.: 13/307,956

(22) Filed: Nov. 30, 2011

Related U.S. Application Data

(60) Provisional application No. 61/424,404, filed on Dec. 17, 2010.

(51) Int. Cl.
*G08B 21/00* (2006.01)

(52) U.S. Cl.
CPC ........................... *G08B 13/28* (2013.01)

(58) Field of Classification Search
CPC .. H04B 3/54; H04B 2203/5445; H04B 3/542;
G08B 21/00; G08B 21/18; G08B 21/02;
G08B 21/182; G08B 21/185; G08B 21/24;
H05B 37/02; H05B 33/0854
USPC .......... 340/310.11, 310.13, 310.16, 458, 635,
340/636.1, 636.18, 657, 660, 661, 664,
340/669; 315/158, 119, 291; 370/438, 462,
370/463, 441, 475, 482, 488
See application file for complete search history.

(56) References Cited

U.S. PATENT DOCUMENTS

| | | |
|---|---|---|
| 1,098,550 A | 6/1914 | Beam |
| 5,019,769 A | 5/1991 | Levinson |
| 6,236,331 B1 | 5/2001 | Dussureault |
| 6,292,497 B1 | 9/2001 | Nakano |
| 6,348,766 B1 | 2/2002 | Ohishi et al. |
| 6,448,716 B1 | 9/2002 | Hutchison |
| 6,456,016 B1 | 9/2002 | Sundahl et al. |
| 6,456,045 B1 | 9/2002 | Troy et al. |
| 6,635,974 B1 | 10/2003 | Karuppana et al. |
| 6,667,623 B2 | 12/2003 | Bourgault et al. |
| 6,717,526 B2 | 4/2004 | Martineau et al. |
| 6,906,522 B2 | 6/2005 | Bertness et al. |
| 6,919,725 B2 | 7/2005 | Bertness et al. |
| 6,983,210 B2 | 1/2006 | Matsubayashi et al. |
| 7,081,755 B2 | 7/2006 | Klang et al. |
| 7,132,805 B2 | 11/2006 | Young |

(Continued)

OTHER PUBLICATIONS

"Recommended Practice for the Economic Analysis of Lighting", IESNA RP-31-96, Illuminating Engineering Society of North America, New York, USA, 1996, 12 pages.

*Primary Examiner* — Travis Hunnings
*Assistant Examiner* — Sharmin Akhter
(74) *Attorney, Agent, or Firm* — McKee, Voorhees & Sease

(57) ABSTRACT

Disclosed herein are apparatus, methods, and systems for assessing the life span of a product and/or system—particularly with respect to end-of-life conditions which are defined by a customer, owner, operator, or other person(s) associated with the product and/or system—and communicating the assessment to said customer, owner, operator, or other person(s). According to one aspect, end-of-life conditions are defined in terms of product life (e.g., anything that relates to how well and how long the product/system operates) and/or economic life (e.g., anything that relates to the cost of deriving a benefit from the product/system). In one particular example, the products or systems relate to lighting systems, particularly those utilizing LED (or other solid-state) light sources.

22 Claims, 8 Drawing Sheets

(56) References Cited

U.S. PATENT DOCUMENTS

| | | |
|---|---|---|
| 7,138,970 B2 | 11/2006 | Krohn |
| 7,208,914 B2 | 4/2007 | Klang |
| 7,391,337 B2 | 6/2008 | St.-Germain |
| 7,425,798 B2 | 9/2008 | St.-Germain |
| 7,778,635 B2 | 8/2010 | Crookham et al. |
| 7,791,348 B2 | 9/2010 | Brown et al. |
| 7,839,295 B2 | 11/2010 | Ries, II |
| 7,940,052 B2 | 5/2011 | Vonderhaar et al. |
| 7,956,556 B1 | 6/2011 | Gordin et al. |
| 8,164,343 B2 | 4/2012 | Bertness |
| 2003/0015973 A1 | 1/2003 | Ovens et al. |
| 2004/0212309 A1 | 10/2004 | St.-Germain |
| 2008/0133211 A1* | 6/2008 | Dombrowski et al. ......... 703/22 |
| 2009/0066258 A1* | 3/2009 | Cleland et al. ................ 315/158 |
| 2009/0167537 A1* | 7/2009 | Feliss et al. .................. 340/584 |

\* cited by examiner

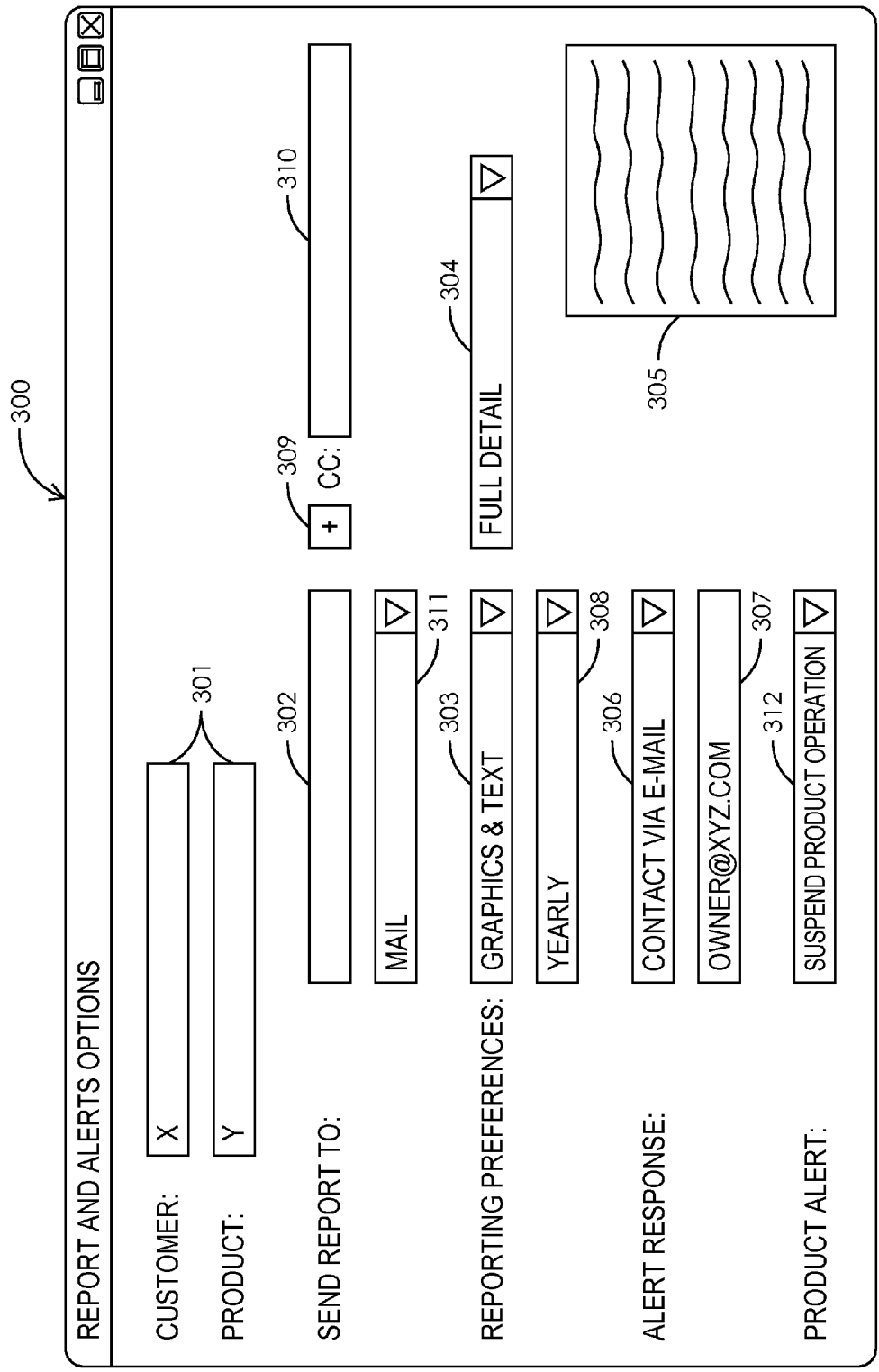

APPARATUS, METHOD, AND SYSTEM FOR DETERMINING END-OF-LIFE OF A PRODUCT

CROSS-REFERENCE TO RELATED APPLICATIONS

This application claims priority under 35 U.S.C. §119 to provisional U.S. application Ser. No. 61/424,404, filed Dec. 17, 2010, hereby incorporated by reference in its entirety.

I. BACKGROUND OF THE INVENTION

The apparatus, methods, and systems described herein relate to determining end-of-life conditions for products and/or systems and providing ways to communicate end-of-life to a customer, owner, operator, or other interested party. As described herein, the term end-of-life (EOL) refers to the point in time in a product's life span wherein the product is no longer operational, no longer useful for its intended purpose, or is not economical to operate (as determined by said customer, owner, operator, or other interested party).

It is generally understood that many products have a life span, the life span typically defined by the manufacturer of the product. Manufacturers often estimate a life span on a sampling of data; as an example, a lamp manufacturer may randomly select some number of lamps from a much larger group, measure the operating hours until product failure for the selected lamps, average the measurements, and report the average as the life span for all lamps of the same make and model as those few tested. In this example, the end-of-life (EOL) condition is defined as the point when the product fails and typically occurs at the end of the product's life span; of course, if the product can be repaired and it is advantageous to do so, this EOL condition does not occur at the end of the life span.

Estimating a life span in this fashion is only somewhat accurate and does not take into account varying operating conditions which may affect EOL. For example, a customer could operate a lamp according to the manufacturer's recommendations and have a reasonable estimate of life span, but then change the operating conditions and have no idea how the life span has been impacted. Further, estimating a life span in this fashion does not take into account the different ways in which a customer, owner, operator, or interested party may define EOL conditions; for example, an owner may want to define EOL with respect to economic factors (e.g., cost to operate) rather than product failure. In practice, there could be multiple EOLs for a product and/or system, not all of which occur at the very end of the life span and not all of which can be estimated by the manufacturer.

Herein lies a problem—customers, owners, operators, and the like (hereafter referred to as users) typically do not have the expertise or information available to determine an accurate or user-relevant life span for a product given their unique operating conditions and criteria for end-of-life and further, may be completely unaware of the true performance of the product and/or system over time. This can lead to an inability to adequately prepare for the EOL of a product and/or system (e.g., by securing funds for a replacement product) and an inability to recognize opportunities for reducing cost (e.g., by operating under different conditions to extend a product's life span, identifying alternative/replacement products which cost less to operate, etc.).

One challenge for the user is identifying one or more end-of-life (EOL) conditions for a product and/or system (hereafter referred to as a product) when the EOL is based on performance or economics but the product itself still appears to function (i.e., has not experienced product failure). Using the aforementioned example of a lamp, a user can readily recognize a lamp that has burnt out (i.e., a product failure) but is typically unable to recognize when the lamp is consuming twice as much power for a given light output as it did initially; the latter may be related to lamp lumen depreciation (LLD), a phenomenon in which the lamp produces less light for the same power input over time.

Developing accurate life spans for lighting systems and/or lamps including light sources which experience LLD is further complicated because of the different operating modes available. For example, some lighting systems are operated at a constant wattage; over time LLD is manifested as a noticeable decrease in the light produced by the lighting system. In this example, a user would likely notice this decrease and know an EOL condition was impending. However, not all light sources deteriorate at the same rate or fail in the same manner. For example, an LED will simply become more and more dim until any light output is indiscernible—and therefore never reach a product failure-based EOL—whereas some light sources burn out or otherwise fail long before they reach any economic-based EOL. Alternatively, if a lighting system is operated in constant light mode (i.e., where incremental power increases maintain near-constant light output despite LLD), there is no visual indication that the lamp is degrading so a user is often unaware of an impending EOL condition regardless of how EOL is defined.

Thus, there is a need to provide users with the tools to adequately assess the life span of a product and further, tools to reassess the life span of a product as operating conditions change and EOL conditions are defined. This need is particularly fervent for users of lighting systems (or components thereof) because of the longevity of the product (e.g., some LEDs can be operated for tens of thousands of hours) and the economic impact to operate the product over time (e.g., operating dozens of HID lamps for several hundred hours per year for several years can cost several thousands of dollars in energy consumption). Thus, there is room for improvement in the art.

II. SUMMARY OF THE INVENTION

As has been stated, determining an accurate life span for a product is problematic because users lack the tools to do so and manufacturers of the product often define life spans for specific operating conditions using product failure as the sole end-of-life (EOL) condition. Disclosed herein is an approach to determining a product's life span by user input so to ensure the life span reflects the user's unique operating conditions and self-defined EOL(s).

For purposes of the invention, the life span of a product can generally be considered in the context of product life or economic life (though a product's life span could be delineated in other ways). Product life generally represents the ability of the product to function as intended; a product life EOL could comprise product failure or failure of some component, reaching some operational limit, or reaching some threshold below which performance is unacceptable, to name a few examples. Economic life generally represents the cost of owning and operating the product; an economic life EOL could comprise a threshold input level (e.g., power consumption), a ratio of output to operating cost beyond which replacement parts and/or alternative technologies should be considered, or an unfavorable result to a periodic cost analysis, to name a few examples.

Ultimately, the life span of a product can be broken down and EOLs defined according to a user's need and what is relevant to the product. Of course, it may be desirable to extend the life span of a product. An objective, then, can be to use the user-defined EOLs as triggers for performing an activity related to extending or otherwise altering the life span of the product. For example, if a user encountered a product failure—a product life EOL—then the user could attempt a repair on the product. Likewise, if a user encountered a power consumption threshold—an economic EOL—the user could adjust operating conditions.

It is therefore a principle object, feature, advantage, or aspect of the present invention to improve over the state of the art and/or address problems, issues, or deficiencies in the art.

Further objects, features, advantages, or aspects of the envisioned invention may include one or more of the following, but are not limited to:

a. defining a product's life span and end-of-life conditions in accordance with a user's needs and/or preferences;
b. identifying metrics and/or data relevant to calculating or otherwise determining the end-of-life conditions;
c. communicating the condition of a product to the user and/or manufacturer as it relates to the product's life span;
d. reassessing a product's life span and end-of-life conditions in response to a change in operating conditions, user preference, or otherwise; and
e. providing users with apparatus and methods of evaluating the cost effectiveness of a product given a set of operating conditions.

These and other objects, features, advantages, or aspects of the present invention will become more apparent with reference to the accompanying specification.

III. BRIEF DESCRIPTION OF THE DRAWINGS

From time-to-time in this description reference will be taken to the drawings which are identified by figure number and are summarized below.

FIG. 4 illustrates one possible web interface for recording user reporting preferences according to aspects of the present invention.

Figure 1:
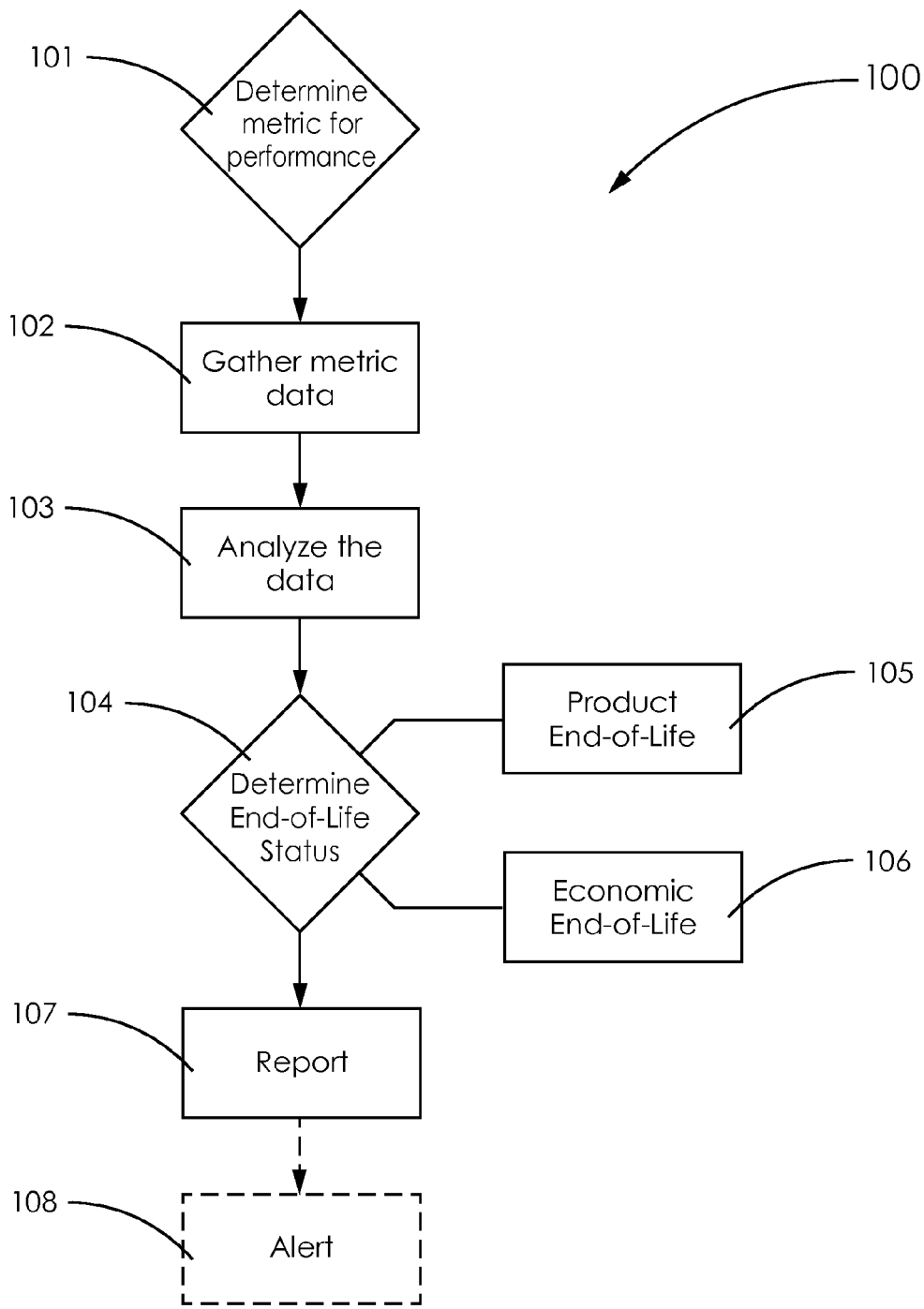
FIG. 1 illustrates in flowchart form a method of assessing a product's life span according to aspects of the present invention.

FIGS. 5A-D illustrate an exemplary lighting system for use with the method of FIG. 1.

Figure 5A:
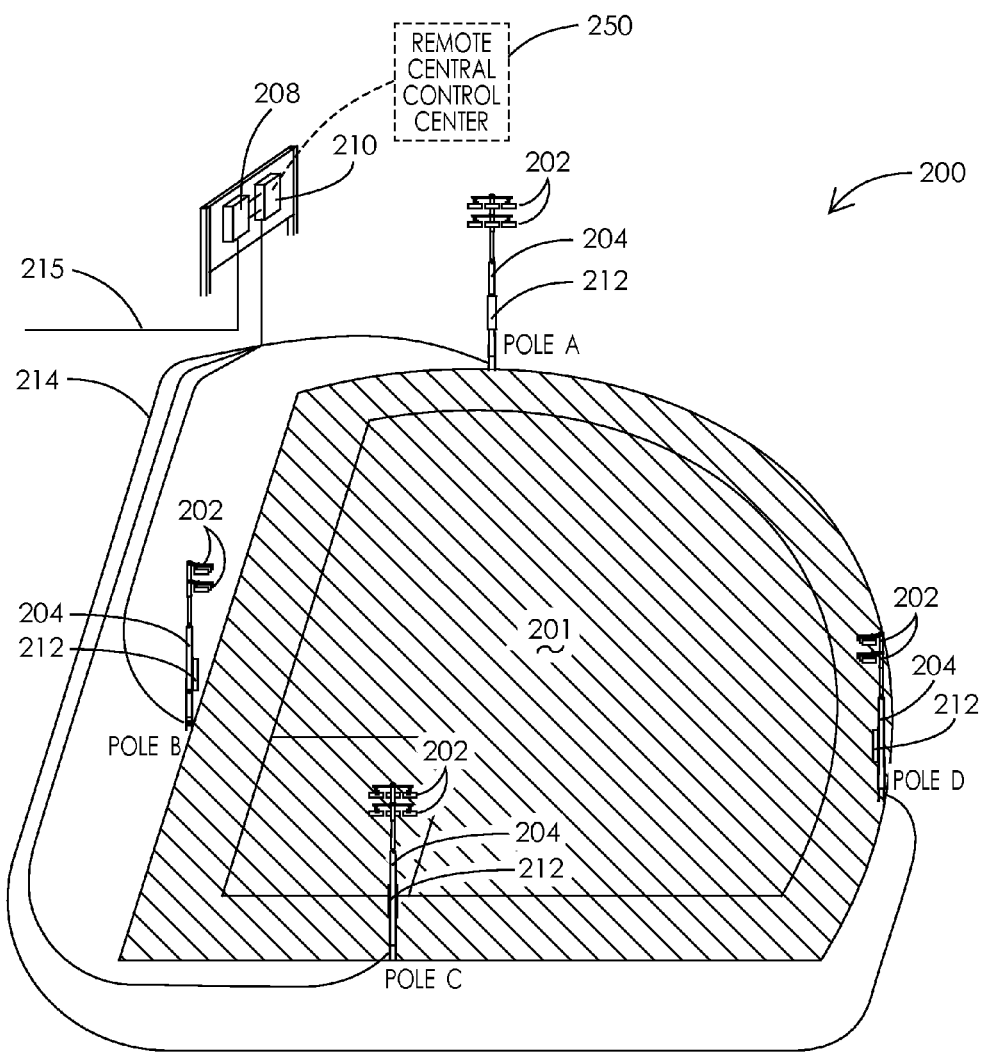
Figure 5B:
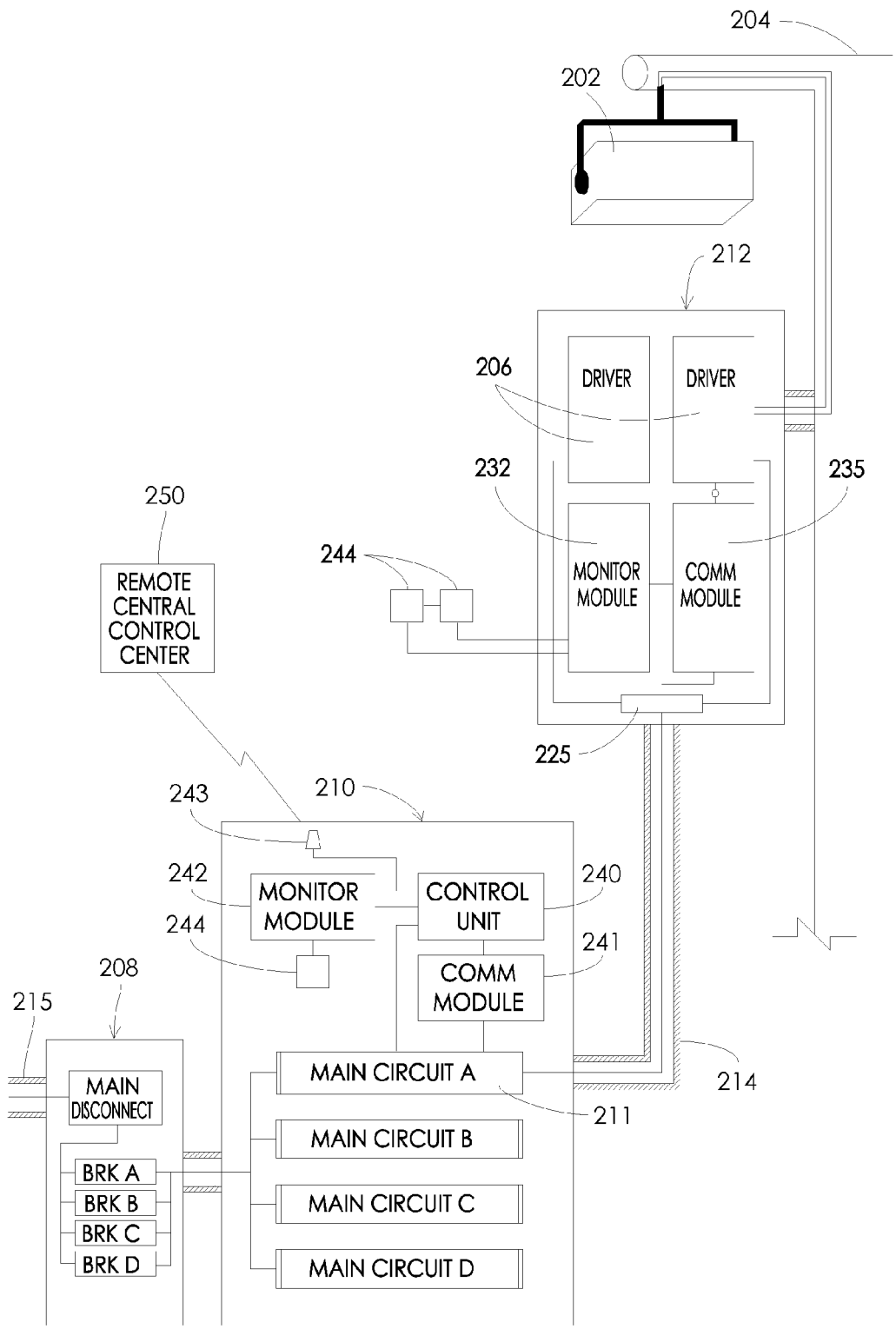
Figure 5C:
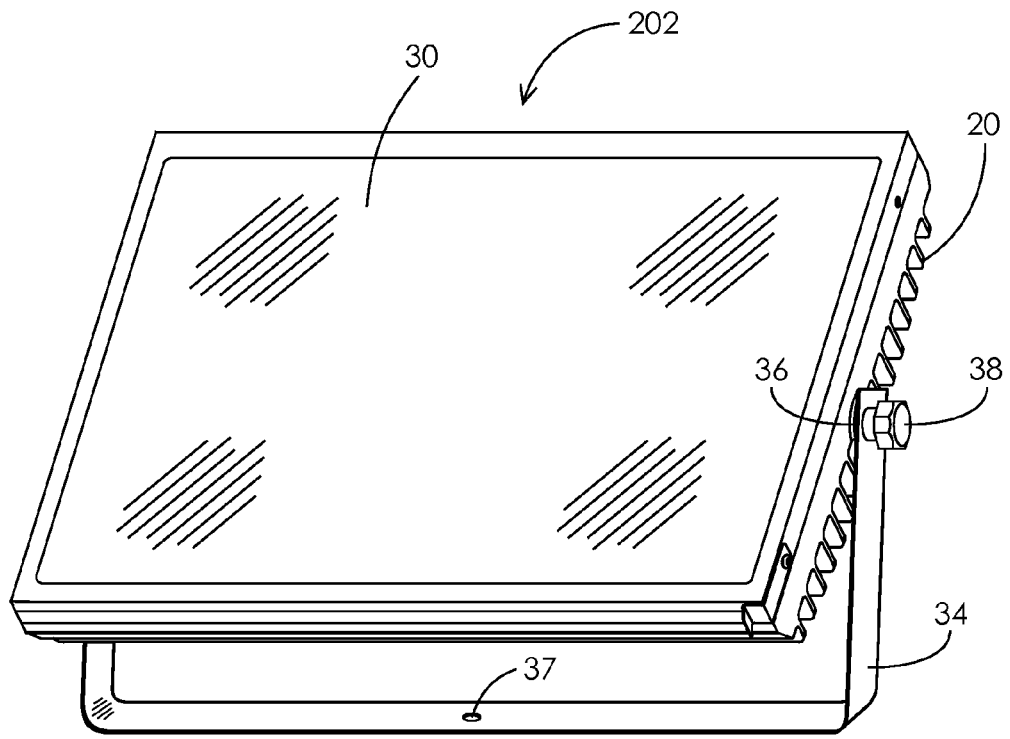
Figure 5D:
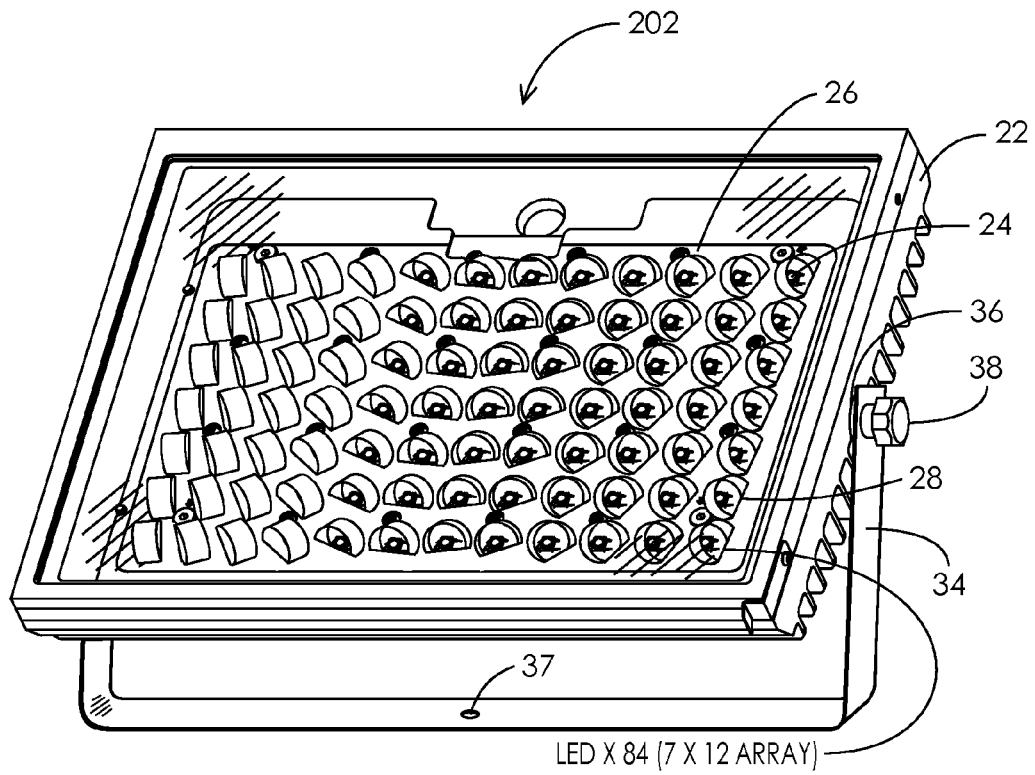
Figure 6:
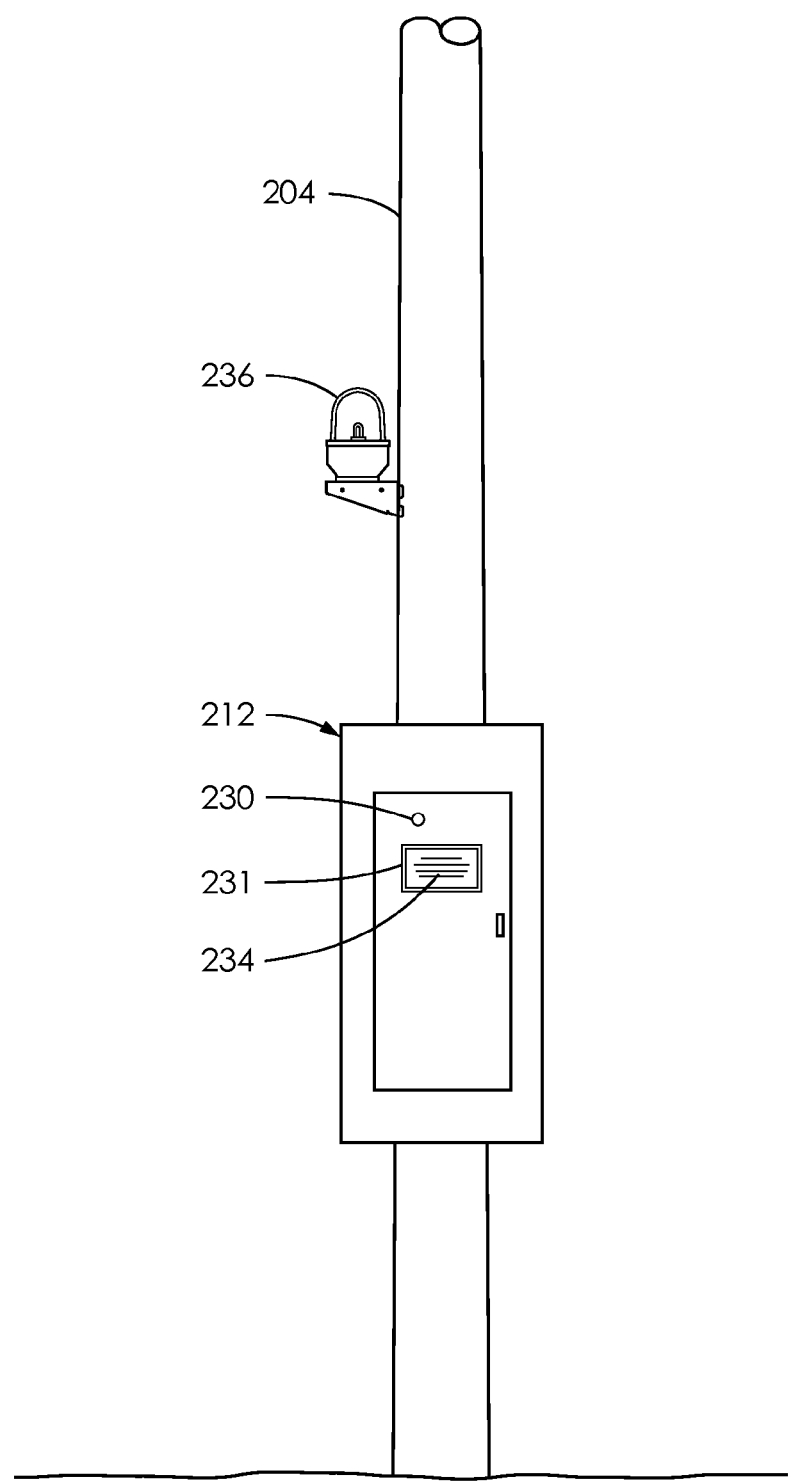

FIG. 6 illustrates features of an optional alert system that may be incorporated into the lighting system of FIGS. 5A-D.

IV. DETAILED DESCRIPTION OF EXEMPLARY EMBODIMENTS

A. Overview

To further an understanding of the present invention, specific exemplary embodiments will be described in detail. Frequent mention will be made in this description to the drawings. Reference numbers will be used to indicate certain parts in the drawings. Unless otherwise indicated, the same reference numbers will be used to indicate the same parts throughout the drawings.

As previously stated, aspects according to the present invention enable a user to determine the life span of a product for a set of operating conditions and/or determine if the product has reached an end-of-life (EOL) condition based on a number of factors that influence the product's life span. That being said, determining a product's life span and determining appropriate EOL conditions need not be completely user-driven to benefit from aspects of the present invention. For example, an initial life span estimation provided by the manufacturer of the product could serve as a starting point for the processes discussed below. As another example, any warranty a manufacturer provides for the product would likely influence an EOL condition. As envisioned, cooperation between the user, the manufacturer, and a third party (i.e., the provider of the methodologies set forth in this application) leads to a more realistic estimation of a product's life span; however, input from all three entities is not required to practice the invention, nor is it required that three distinct entities exist.

To provide a consummate approach to assessing a product's life span, consideration should be given to sources other than the user or the manufacturer who may impact the development of EOL conditions and/or reassessment of the life span. Take again the example of a lighting system, and in particular, a lighting system in which the light sources experience LLD. Assume the lamp manufacturer provides an estimated life span for a set of operating conditions with the assumption that the lamp will fail at the end of the life span. Now assume the lamp is operated for a long period of time (e.g., several years) and the light output from the lamp is slowly diminishing over this time (in this example the system is operated in constant wattage mode). Light output diminishes until it crosses a minimum light output threshold (i.e., a product life EOL); at this point the user (typically with the aid of the third party) may reassess the operating conditions to determine if a different combination of inputs might extend the life span or increase the light output so the EOL is not triggered. However, assume over these several years a new technology is developed and commercialized; a new type of light source is one example. Even though this new technology is not owned by the user or the manufacturer, its availability may warrant a feasibility study and thus, a new EOL could be developed (e.g., an operating cost beyond which it is advantageous to retrofit the lighting system with the new technology).

B. Exemplary Method and Apparatus Embodiment 1

A more specific exemplary embodiment, utilizing aspects of the generalized example described above, will now be described.

Referring to FIG. 1, determining an end-of-life condition as it relates to a product's life span can generally be described according to method 100 which comprises the following steps: determining the appropriate metric(s) for evaluating performance of the product (step 101), gathering data on the metric(s) (step 102), analyzing the data (step 103), assessing end-of-life status (step 104) based on product life (reference no. 105) and/or economic life (reference no. 106), reporting to the user (step 107) and, if desired, initiating an alert indicating end-of-life (optional step 108).

1. Determine the Metric(s) for Evaluating Performance—Step 101

Metric(s) that reflect a product's performance can be used to assess and reassess a product's life span and estimate when a defined EOL may occur. The metric(s) can be selected according to user preference, industry standards, or otherwise, but should be chosen considering the product itself and its operating conditions. For example, if the product is a lamp, then its performance might be evaluated in terms of power consumption, light output, and color temperature (though other metrics are possible). While a user might also be concerned with the lead time in procuring said lamp, this is not related to the lamp's performance, and would not likely be a metric selected for step 101.

Typically, the metric(s) determined in step 101 relate to the work performed by the product and how that work can be evaluated (e.g., how work can be performed efficiently). However, method 100 is not limited to products that perform work or metrics that measure work. Other non-work metrics, such as aesthetics, may also be used to evaluate performance.

2. Gather Metric Data—Step 102

The metric(s) established in step 101 may be measured and recorded for evaluation in step 102. Data may be measured and recorded continuously, periodically, or otherwise. Data may be measured using apparatus and methods well known in the art, using specialized devices, or may be derived from other data.

So using the example of a lamp where performance is evaluated in terms of power consumption, light output, and color temperature, the corresponding devices for measuring such may be a watt-meter, photocell, and chroma meter (also referred to as a color temperature meter or a light meter), respectively. Looking specifically at color temperature, an example of a specialized device may be an integrating sphere with associated software and an example of deriving the data may comprise measuring the lamp's spectral power distribution and comparing it to known sources or otherwise calculating a color temperature therefrom. Some approaches may be more feasible than others, though any could be used as long as measurements are made in an accurate and repeatable manner.

3. Analyzing the Data—Step 103

The data measured and recorded in step 102 is analyzed in step 103; as envisioned, this is done by the third party but could be done by another entity. The data can be analyzed in real time or according to some schedule, and can be analyzed on-site or remotely.

Using the aforementioned example of a lamp, the data from the watt-meter, photocell, and chroma meter could be recorded on-site and the results analyzed later; alternatively, the recorded data could be reviewed immediately. As another example, if the measurement devices are in operative communication with a remotely located control center, then data could be streamed off site and analyzed in real time, or stored and analyzed at a later time. Regardless of the approach to analyzing the data, the data itself may be processed (e.g., averaged, normalized, etc.) prior to analysis, if desired.

The analyzing of data according to step 103 could prompt the user to reassess the life span of the product (possibly resulting in reinitiating method 100) or develop new EOL conditions. For the sake of brevity, the following assumes no such actions are taken and method 100 proceeds according to that illustrated in FIG. 1.

4. Determine End-of-Life Status—Step 104

As stated, the analysis of data according to step 103 could prompt a user to reassess the product's life span, change operating conditions, or otherwise. Assuming these do not occur and assuming also that at least one end-of-life (EOL) condition is in place, the status of the EOL (i.e., projected time until the EOL condition is met) can be assessed in step 104.

Using again the example of a lamp (or luminaire), assume the data regarding power consumption is analyzed and found to be increasing at some rate; assume also that the EOL comprises a power usage threshold. As envisioned, the third party (or other entity) reviews current operating conditions (e.g., hours of daily usage), the increasing rate in power consumption at the current operating conditions (e.g., 0.25 W increase/day for an HID lamp), and the defined EOL (e.g., 1.7 kW for an HID lamp rated for operation at 1.5 kW), and predicts how long the product can operate at the current operating conditions until the EOL is reached. In this example, if the EOL is met the product will still function, though not in accordance with the user's preferences.

In practice, an EOL can be defined in a variety of ways according to user preference or otherwise; by way of example and not by way of limitation two categories of EOLs are presently discussed.

a) Product End-of-Life—Reference No. 105

Figure 2:
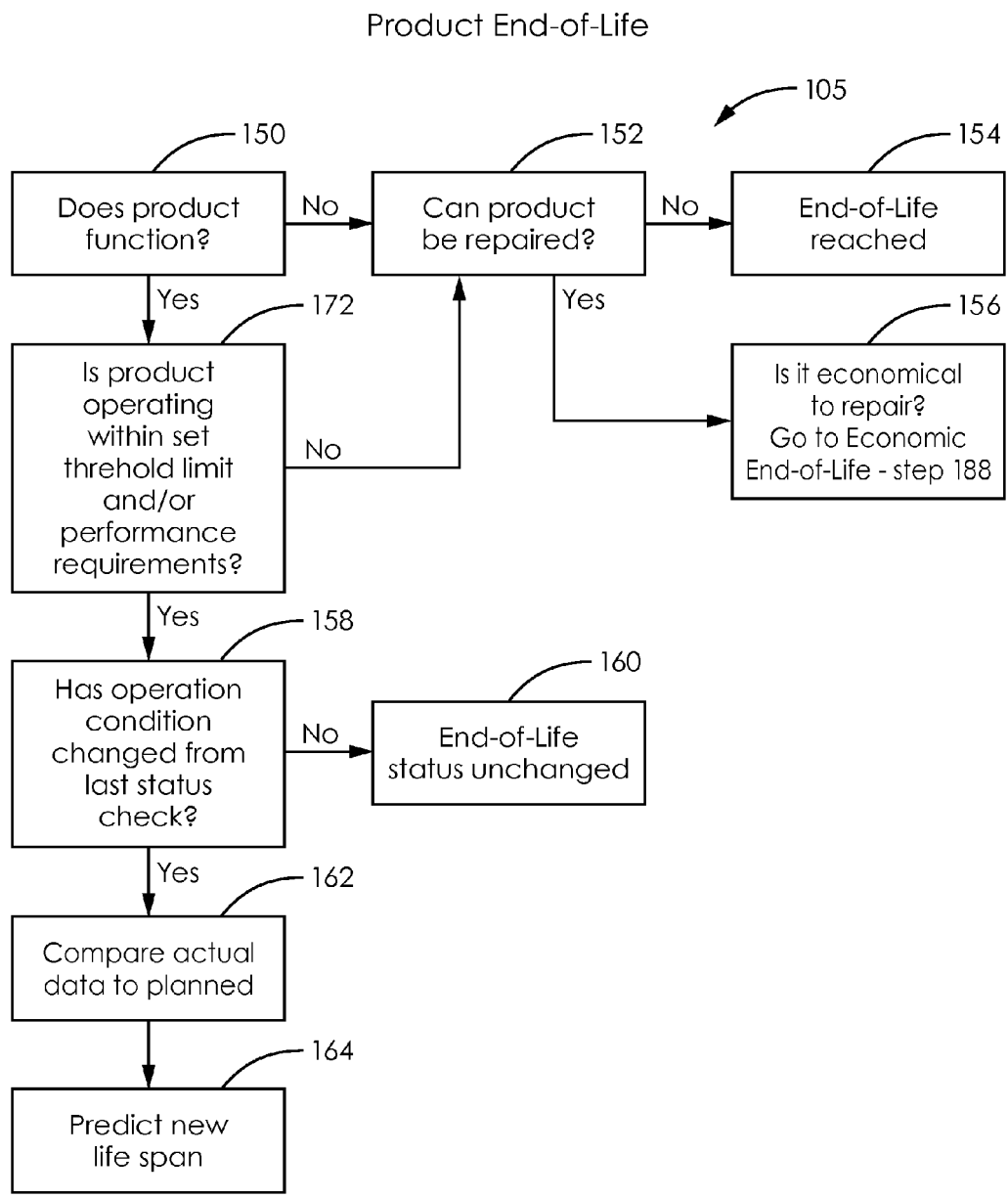
FIG. 2 illustrates in flowchart form a method of determining product end-of-life conditions according to the method of FIG. 1.

One way in which an end-of-life (EOL) condition can be defined for a product is in terms of the product life; namely, anything that relates to how well and how long the product operates. One way in which method 100 may be executed given a product life EOL is illustrated in FIG. 2; though this is but one way to practice method 100.

To assess the status of a product EOL one should first determine if the product functions (reference no. 150); if not, one should determine if the product can be repaired so to function (reference no. 152) and if so, if it is economic to do so (reference no. 156). If the product is not functional and cannot be repaired, it has reached an EOL condition (reference no. 154). Of course, if the product can be repaired, the user could choose to repair the product regardless of the economic impact and so not perform any sort of economic EOL assessment.

Assuming the product is functional, one should determine if the product is operating in accordance with any limits, thresholds, etc. set by the user, manufacturer, third party, or other persons (reference no. 172). If so, one should determine if operating conditions have changed since the last assessment of EOL status (reference no. 158). If there have been no changes to the operating conditions and the product is operating within established limits, the EOL status has not changed (reference no. 160). However, if operating conditions have changed from the last EOL status assessment then one may compare the analyzed data (step 103) or other information to anticipated data or other information based on the new operating condition, if such data/information is available (reference no. 162). This allows the third party or other persons to predict a new product life span (reference no. 164) based on the change in operating conditions. In this manner, method 100 accurately predicts the time until a product EOL is reached regardless of changes to the product's life span.

b) Economic End-of-Life—Reference No. 106

Figure 3:
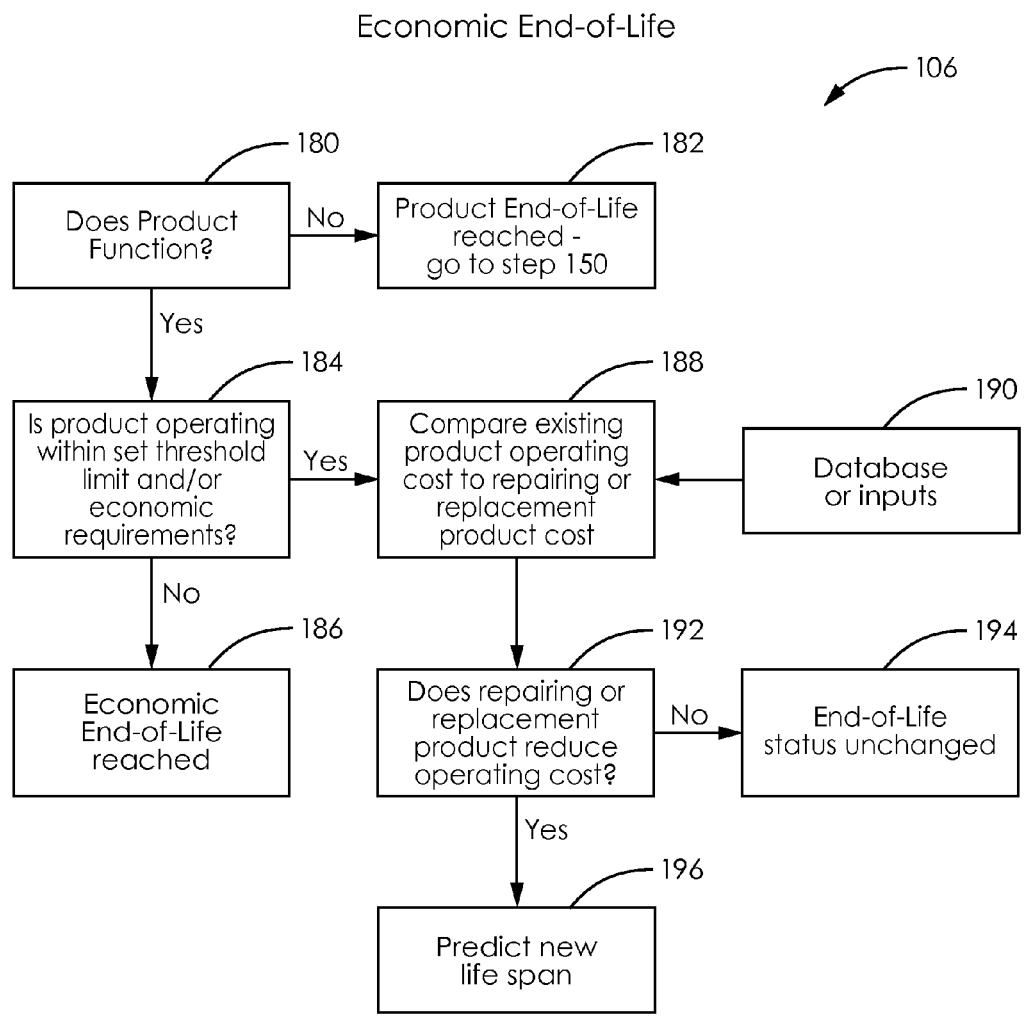
FIG. 3 illustrates in flowchart form a method of determining economic end-of-life conditions according to the method of FIG. 1.

Another way to define an end-of-life (EOL) condition is to look at the economic life of the product; namely, anything that relates to the cost of deriving a benefit from the product. One way in which method 100 may be executed given an economic life EOL is illustrated in FIG. 3; though this is but one way to practice method 100.

To assess the status of an economic EOL one should first determine if the product functions (reference no. 180); if not, a product life EOL has been reached (reference no. 182). Assuming the product is functional, one should determine if the product is operating in accordance with any limits, thresholds, etc. set by the user, manufacturer, third party, or other person(s) (reference no. 184); if not, then the economic EOL has been reached (reference no. 186).

If the product is functional and operating within established economic limits, one should make a comparison between existing operating costs and the cost to replace or repair the product (reference no. 188). Making a comparison between operating the existing product and replacing or repairing the existing product may be simple or complex, and may involve input from the user or information from some other source (reference no. 190). For example, if the product is a lamp and one of the metrics measured is power consumption, the user may be aware of local power rates (e.g., S/kW-hr) and is able to provide input regarding the cost to operate the current product. The cost to operate the lamp may then be compared to the cost of repairing the lamp or replacing the lamp with a different technology (e.g., replacing a single metal halide lamp with several LEDs); depending on the user-defined complexity of the comparison, the cost of replacing the lamp may include repair costs, capital costs, training costs, and the like. If the comparison between the current product and a replacement/repaired product (reference no. 192) shows that operating the current product is favorable, then the economic EOL is unchanged (reference no. 194). If there is an indication that the replacement/repaired product may be favorable, the third party may predict a new life span (reference no. 196). In this manner, method 100 accurately predicts the time until an economic EOL is reached regardless of changes to technological advancements in the industry.

5. User Reporting—Step 107

Looking back to method 100, after the status of one or more EOL conditions is assessed (step 104) a report may be issued to the user (step 107). The exact content of the report depends on how end-of-life (EOL) conditions are defined and the user's preferences, among other considerations. For example, assume the user defines a product life EOL; the user may request not only documentation of the comparison of actual data to anticipated data (reference no. 162), but may request that the third party provide suggestions for extending the product's life span and/or bringing the product back into conformance. As another example, assume the user defines an economic life EOL; the user may request not only documentation of the comparison of the existing product cost to replacement product costs (reference no. 188), but may request that the third party provide suggestions for alternative technologies to consider and/or methods of repairing or upgrading the existing product.

A report may be issued when the user requests one and whenever method 100 is applied to a product, regardless of whether an EOL has been reached (see reference nos. 105 and 106). In many cases it may be preferable to establish a template for reporting to ensure the user receives consistent correspondence; FIG. 4 illustrates, by way of example and not by way of limitation, one such template. In this example, the user may access a webpage and define the format of the report, content level, and desired response to alert conditions; if desired, this may be done prior to method 100 or periodically as metrics, EOLs, and other factors associated with method 100 are changed.

Screen 300 is a typical representation of the envisioned user interface and may generally be characterized according to the following.
  a. The user name, address, product description, and other pertinent information may be recorded in fields 301.
  b. The user designates who receives the report in field 302 with additional recipients designated by clicking on plus symbol 309 and completing entry in field 310. The method of preferred communication is selected in drop-down menu 311 (e.g., mail, email, fax, etc.).
  c. The user specifies the content of the report and how the user prefers to receive the report in drop-down menus 304 (e.g., summary of EOL status, summary+recommendations, summary+recommendations+data analysis (i.e., full detail), etc.) and 303 (e.g., graphically, textually, etc.), respectively. The selectable options for drop-down menus 303 and 304 may depend on the product, user input, etc., or could be a set feature of method 100.
    i. Field 305 is populated with explanations of the selections made in menus 303 and 304. As envisioned, field 305 refreshes when a new 23 selection is made such that the user can evaluate the various 24 combination of options. Field 305 could be further expanded to explain any of the fields on screen 300.
  d. The user specifies the frequency with which method 100 is applied to the product in drop-down menu 308; of course, method 100 could also be applied upon user request and is not restricted to any schedule.
  e. The user chooses options for how to receive an alert response (discussed in step 108) from drop-down menu 306; some other options for this field may include contact via phone, indicate on the report but do not contact directly, or the like.
    i. If the user wants to use information other than what is documented in field 301 (e.g., so that alerts can be immediately routed to the correct department within a large organization), this information can be recorded in field 307.
  f. The user may choose options for addressing product alerts in drop-down menu 312. The content of drop-down menu 312 may vary depending on the nature of the product, the user's preferences, and ability of the third party to control operation of the product, to name a few considerations.

6. Alerts—Optional Step 108

If desired, an alert may be communicated to the user to indicate an impending or reached EOL condition. For example, if the user defines product failure as a product life EOL, then the corresponding alert may simply be the lack of function of the product. However, this is not particularly useful for a user who may looking for ways to extend a product's life span or to be made aware of impending EOL conditions which are not readily ascertained. So for example, assume a product life EOL is defined as the point when a measured output drops below some threshold; when the threshold is crossed an indicator light in proximity to the product may illuminate, an audible alarm may sound, a message could scroll on a display panel in proximity to the product, an established operating procedure (e.g., shutdown procedure) may initiate, or otherwise. Of course, it is not required that an alert be incorporated into the product or otherwise installed on-site for method 100 to operate as intended; many times, reporting (see step 107) provides a user with sufficient information regarding the "health" of the product.

C. Exemplary Application of Embodiment 1

The following describes an exemplary application in accordance with Embodiment 1.

In the present application, the product is a lighting system and the user is the owner, operator, or other person(s) associated with the operation of the lighting system.

1. Overview of the Exemplary Lighting System

Illustrated in FIGS. 5A-D is an envisioned outdoor lighting system 200, the operation of which may generally be characterized according to the following.

a. Luminaires 202—each employing a plurality of LEDs as the light source—are mounted on appropriate structures—such as on poles 204 having one or more cross arms—and generally aimed so to illuminate target area 201. The exact placement of poles 204, number of luminaires 202 affixed to said poles, and the exact aiming angles of said luminaires are typically determined by a lighting designer well before installation of the equipment on-site.

b. Power is supplied from a utility grid or other power source (see reference no. 215) to an electrical distribution panel 208 where it is divided into individual circuits (typically one circuit for each set of lighting equipment at each pole 204, though circuits may be shared between multiple locations of lighting equipment). A control enclosure 210 includes equipment which provides on/off control of power to each circuit, the power being distributed along lines in conduit 214; typical on/off control mechanisms include a relay or some form of switch, and may be engaged/disengaged manually or remotely.

i. Luminaire 202 may require a power regulator as part of the electrical system. For example, HID lamps require a ballast-capacitor system to control the voltage and current to the lamp. For solid-state lighting, in particular light emitting diodes (LEDs), a driver (also referred to as power supply) provides the power required by the LEDs. Regardless of the type of power regulating equipment, it may be integral to luminaire 202 or may be housed remotely, such as in enclosure 212.

c. The lighting of target area 201 is typically controlled via components in enclosure 210 and includes more than on/off control of luminaires 202. For example, many state of the art lighting systems have some capability to provide intermediate lighting levels (i.e., dimming capability). As an example, a user may actuate a device (e.g., high-medium-low (HML) switch) which sends a control command from communication module 241 (see FIG. 5B) to communication module 235 along power wiring in conduit 214, which instructs driver 206 to reduce the power provided to luminaire 202. Dimming capability is useful, for example, to operate at a lower power setting (e.g., correlating to 50% light output) during practices—as opposed to tournament play—to realize cost savings.

i. As envisioned, the present lighting system also includes provisions for addressing lamp lumen depreciation (LLD) by incrementally increasing power to luminaires 202 so to maintain a near-constant light output (if a near-constant light output is preferred by the user); an example of operating in "constant light mode"—particularly for LED light sources—is discussed in U.S. patent application Ser. No. 11/842,808, now U.S. Pat. No. 7,956,556, incorporated by reference herein.

2. Components of the Exemplary Lighting System with Respect to Method 100

Thinking in terms of the product and the user as it applies to method 100, the product (i.e., the lighting system) may be further characterized according to the following.

a. As is illustrated in FIGS. 5C and D, luminaires 202 comprise a housing 22 constructed of aluminum (or aluminum alloy) including integral cooling fins 20. The aluminum construction provides good thermal conductivity to draw heat away from LEDs 24, is lightweight, and is durable in adverse weather conditions.

b. A positioning plate 26 is affixed to the interior of housing 22 and secures LEDs 24 (which are affixed to a circuit board—not illustrated) and optical components 28 in a desired orientation (i.e., at a defined aiming angle). In this example, optical components 28 comprise reflectors designed to produce particular beam characteristics though lenses, diffusers, or the like could be used instead or in combination with reflectors 28.

c. A transparent cover 30 seals LEDs 24, optical components 28, plate 26, and all associated wiring and hardware in housing 22 so to prevent moisture or other adverse environmental conditions from damaging components of luminaire 202. FIG. 5C illustrates cover 30 as opaque (for illustrative purposes) and FIG. 5D illustrates cover 30 as transparent (as in practice).

d. In practice, luminaires 202 may be affixed to pole 204 via a yoke-type framework 34 (also referred to as a trunnion mount). Framework 34 may be constructed from formed aluminum bar or plate into a general U-shape with holes 36 for mounting to the sides of housing 22 with bolts 38 or knobs or analogous components, as one example. This style of mount allows attachment to a variety of structures with a simple mounting hole 37 and one or more fasteners, and typically allows for two degrees of freedom (also referred to as pivot axes or tilt axes) for placing light in the desired locations. In this example, luminaire 202 pivots about an axis extending along the length of bolt 38 and an axis extending along its attachment to pole 204 through hole 37.

Considering again method 100, if the product is the lighting system then a primary input is power (or voltage, current, or the like). A more detailed look at how power is distributed to and throughout the lighting system is illustrated in FIG. 5B and may be further characterized according to the following. It is of note that for brevity FIG. 5B illustrates details for a single luminaire 202 on circuit A (i.e., the circuit associated with Pole A); however, one of average skill in the art would be aware similar circuits exist for Poles B-D and that the load is not limited to a single luminaire. It is of further note that, as illustrated, power distribution is diagrammatically illustrated as a single line; this is not intended to indicate single phase power or any particular power rating or amperage capacity.

a. Power delivered to the site (see reference no. 215) reaches distribution panel 208 and is portioned out for each circuit. In this example, each circuit includes contactors 211 which may be engaged/disengaged locally (e.g., by the user via an on-off-auto (OOA) switch), remotely (e.g., by the third party via a signal communicated to control unit 240), or both to provide/terminate power to luminaires 202 on that circuit.

b. Power at contactor module 211 in control cabinet 210 travels to distribution block 225 at pole 204 via wiring in conduit 214. From there power is routed to individual components within enclosure 212 (e.g., drivers 206, communication module 235, etc.)

c. Power to luminaires 202 is provided/regulated by a driver 206 (shown as remotely located from the luminaire, though this is by way of example and not by way of limitation). Typically, each luminaire has a dedicated driver each of which is designed or selected so to operate over a predefined range. For example, to operate luminaires 202 in constant light mode, the associated drivers must be capable of providing the lower initial power level, the higher final power level, and each power level between; also, it is often undesirable to select a driver capable of providing significantly more power than is needed (e.g., due to a lower driver efficiency).

Considering again method 100, if the product is the lighting system and a primary input is power, then a primary output is light projected from the luminaires, particularly light which illuminates the defined target area. A more detailed look at how light is closely controlled so to adequately illuminate the target area is illustrated in FIGS. 5A and B, and may be further characterized according to the following.

a. Before equipment is installed on-site, typically a lighting designer meets with the user to determine the various operating parameters associated with the product. For example, the user will generally specify an estimated usage (e.g., hrs/yr), a desired light level at target area 201 (e.g., 50 horizontal footcandles), and the like. If other factors are important (e.g., anticipated wind speeds, ambient temperature, etc.), this information can be provided by the user or measured on-site.

b. Knowing the operating parameters, the lighting designer may specify the particular number of luminaires 202, the number of LEDs 24 contained therein, pole locations, the aiming angles of both luminaires and LEDs, and the like.

c. Once the equipment is installed, it is typically run according to a programmed schedule which includes on/off commands and automatic adjustments for LLD compensation (see aforementioned U.S. Pat. No. 7,956,556). For example, a remotely located central control center 250 may communicate a series of on/off commands (which are based on user input—e.g., a tournament schedule) which are received by antenna 243 (e.g., in operative connection with a digital radio—not illustrated) and stored/enacted by control unit 240; an example of remotely controlling a lighting system in accordance with a user's preferences is discussed in U.S. Pat. No. 7,778,635 incorporated by reference herein, and available from MUSCO® Lighting, Oskaloosa, Iowa, USA under the product name CONTROL-LINK®. As may be appreciated by one skilled in the art, the commercially available CONTROL-LINK® product may differ from that described in U.S. Pat. No. 7,778,635 as the mode of communication between an on-site component and a central server discussed in said patent (e.g., analog cellular signal) may currently comprise alternate modes of communication (e.g., satellite, Global System for Mobile communications (GSM), Code Division Multiple Access (CDMA), etc.).

d. During operation, if the output of the product is undesirable (e.g., light at the target area is too low) provisions can be made to bring the output into conformance by adjusting power to luminaires 202. For example, a command from central control 250 may be communicated to control unit 240 via antenna 243, that command enacted by control unit 240 and communicated from communication modules 241 to modules 235 via power line carrier communications (also referred to as PLCC, PLD, mains communication, power line communication, power line carrier, etc. within this well established art); of course, other means and methods of communicating and executing control commands between locations are possible, and envisioned.

i. Determining if output is undesirable and by how much can be achieved in a variety of ways. For example, monitoring modules 232 and 242 at each pole location and control enclosure 210, respectively, may gather and process measurements made by sensors 244; sensors 244 may be designed to measure temperature, light output, current, voltage, operating time, or any other metric useful in determining the performance of the product (see step 101 of method 100). Monitoring modules 232 and 242 may communicate raw data, processed data, or an analysis of the data from sensors 244 to control unit 240 to be communicated back to central control center 250 and/or for local display. A control system which monitors data received from sensors to ensure correct operation of a product according to predetermined operating parameters, and could be used with the present invention, is discussed in U.S. patent application Ser. No. 12/879,589, now U.S. Pat. No. 8,537,021, incorporated by reference herein.

3. Application of Method 100 to the Exemplary Lighting System

By way of example and not by way of limitation, assume method 100 is applied to the lighting system illustrated in FIGS. 5A-D and further, that the lighting system illustrated in FIGS. 5A-D is being operated in constant light mode. As previously stated, operating in constant light mode means degradation of the LEDs will not be manifested as a decrease in light output because incremental power increases counteract this effect.

Prior to initiating method 100, the user—with the aid of the third party—defines EOL conditions; assume the user designates one product EOL condition (product failure) and one economic EOL condition (a threshold efficacy (which is typically measured in lumens/watt)). The user then establishes a reporting template via webpage 300; assume the user requests a yearly report (see reference no. 308). After establishing the above, as well as communicating initial operating conditions to the third party, the user operates the product as intended. If desired, the third party could provide an initial life span assessment based on the established EOLs and initial operating conditions. After one year the third party initiates method 100; of course, the user could initiate method 100 much sooner, if desired.

a) Determine the Metric(s) for Evaluating Performance (101)

Having knowledge of the product, the established EOL(s), and initial operating conditions, the third party can determine the metric(s) for evaluating performance of the lighting system. Alternatively, the user could develop the metric(s) or aid the third party in developing the metric(s). As previously stated, it is preferable that the metric(s) reflect the actual operation and/or use of the product; as the product is a lighting system, the product EOL relates to the longevity of the product, and the economic EOL relates to light output and power consumption, it is logical to assume the metrics decided upon are actual operating hours, light output at the target area, and power consumption of luminaires 202.

b) Gather Metric Data (102)

Looking at the system illustrated in FIGS. 5A-D, operating hours could be measured by a timer (which could be a function integral to control unit 240). Alternatively, operating hours could be measured by remote central control center 250 (which is in communication with the lighting system). As another alternative, the user could provide a measurement/estimation of operating hours.

Light output could be detected by sensors 244 and processed so to represent a relevant measurement by monitoring module 232. Likewise, monitoring module 232 could average the readings from multiple sensors 244 installed at various locations about the target area (presumably at or near each pole location, though this is by way of example and not by way of limitation) to provide a more comprehensive light output measurement for the target area. U.S. patent application Ser. No. 11/963,084, now U.S. Pat. No. 8,575,861, incorporated by reference herein, discusses various means and methods for measuring light output as it relates to a target area, and may be used with the present invention.

Power consumption could be derived from voltage and current measurements in the circuit between drivers 206 and luminaire 202, or inferred from commands communicated from control unit 240 to drivers 206, for example. U.S. patent application Ser. No. 12/850,334, incorporated by reference herein, now abandoned, discusses various means and methods for monitoring power consumption in part or in whole in an electrical system, and may be used with the present invention.

As envisioned, various devices (e.g., photocells, toroids, etc.) are installed in and about the product so that data may be collected and communicated to remote central control center 250 without having to interrupt the operation of the product or requiring an on-site technician to make measurements. The data could be communicated continuously, only when the product is operating (i.e., when the lights are on), or periodically (e.g., weekly), for example. However, a technician could be sent on-site to make measurements, the user could make measurements or communicate estimations to the third party, or other approaches could be taken to gathering the metric data and not depart from aspects of the invention.

c) Analyzing the Data (103)

An added benefit of communicating the data to remote central control center 250 is that all data is routed to the same entity which operates the product remotely; this ensures the analysis of the data is put in the proper context. For example, assume the user specifies an on/off schedule and control center 250 communicates this series of commands to control unit 240. If light output readings are low, then control center 250 can consult the on/off schedule and verify the lights are supposed to be off. As another example, it is well known that operating temperature affects the efficacy of LEDs. If a sensor indicates a high temperature and another sensor indicates a light output greater than necessary (e.g., the lights are on during a particularly hot day and the sun has not yet fully set), then remote central control center 250 could send a command to control unit 240 to decrease the power to luminaires 202; this could allow the luminaires to cool slightly (thus, increasing efficacy) without decreasing light output beyond any user-defined threshold (which can be verified by feedback from the sensors).

Depending on how metrics are measured, some processing may be required prior to analyzing the data; this can be done on-site (e.g., by control unit 240) or remotely (e.g., by control center 250), and could be done manually or via processor. For example, light output could be defined in a variety of ways (e.g., luminance, illumination, etc.) and could be measured in lumens, as a percentage (e.g., as a comparison to a baseline value), or in footcandles (lumens/area (sq. ft.)). Depending on exactly what was measured, data may need to be processed to make a relevant comparison to industry standards, for example. As another example, the data may need to be corrected for ambient light levels. Ultimately, the third party (or other persons completing step 103) should, knowing the EOL conditions, convert the data into the proper form so to make an analysis relevant to how the user has chosen to evaluate the performance of the product.

Of course, there is a benefit to having an abundance of data. As previously stated, multiple photocells (or analogous devices) allow the third party (or other persons) to determine a light output more representative of the entire target area; this helps to minimize any incorrect readings made by damaged sensors. As another example, if power consumption is measured at multiple points in the circuit, during analysis of the data the third party may be able to identify a failed component (e.g., a component not drawing the expected power) or the component in the system which consumes the most power (which may be useful to know during a feasibility study). As another example, measuring operating hours allows the third party to report on the status of the product's life span, even if no operating conditions have changed and an EOL condition has not been reached; this may be useful to a user when the product has a long life span (as in a lighting system) or has other considerations (e.g., a warranty). As yet another example, having an abundance of data over a long period of time allows the third party (or other entity) to develop trends which can be used to predict future performance of the product; for example, by measuring light output and power over several years, one may find from trend analysis that efficacy drops dramatically during the summer months and, knowing this, a user could reschedule events for earlier in the day during these peak months so to capitalize on ambient illumination and operate the lights at a lower power (which is known to improve efficacy, at least in LEDs).

d) Determine End-of-Life Status (104)

Assuming step 103 does not reveal any deficiency in the product or operating conditions which must be immediately addressed, the defined EOL conditions may be evaluated according to step 104.

Taking first the product EOL established by the user—product failure—the third party looks at the analyzed data and addresses the product EOL assessment track 105. If the data shows light output beyond what could be attributed to ambient sources and some degree of power consumption (particularly if measured at a point in the circuit between driver 206 and luminaire 202), the product is likely functioning (reference no. 150); since the product in this example is an entire lighting system, this evaluation should be made for all luminaires and key components (e.g., drivers, control unit 240, etc.), though this is not required. Assuming the product is operational, the third party reviews the analyzed data and determines if the product is operating according to any performance requirements, thresholds, or the like established by the user, manufacturer, and/or other interested parties (reference no. 172); again, any such requirements would likely be established and discussed prior to enacting method 100. Assuming the product is operating within the defined parameters, the third party determines if operating conditions have changed since the last status check (reference no. 158); this can be assessed by reviewing the series of commands communicated from remote central control center 250 since the last status check or communicating directly with the user, for example. Assuming some operational condition has changed (e.g., running LEDs at 1.5 watts instead of 1.0 watts), the third party compares the analyzed data to information provided by the manufacturer (e.g., lumen depreciation curves), past data/trends for the product, or other information and predicts (i) how much life is left at the new conditions and (ii) proximity to any established EOL conditions (reference no. 164).

Taking now the economic EOL established by the user—a threshold efficacy—the third party looks at the analyzed data and addresses the economic EOL assessment track 106. The product has already been determined to be functioning and operating within all defined parameters while addressing the product EOL assessment track 105 so the third party starts by analyzing the data to ensure the economic EOL has not been reached (reference no. 184). Since the data gathered and analyzed included light output and power consumption, a system efficacy is calculated—in lumens/watt—and compared to the EOL condition; if desired, the efficacy of each luminaire could be calculated.

Assuming the EOL condition has not been reached, the third party gathers input from the industry, the user, the product's manufacturer, the manufacturer's competitors, and the like (reference no. 190) to begin comparing the operating cost of the existing product to the operating cost of any potential replacement products (reference no. 188); of course, the third party and/or the user could be collecting information regarding potential replacement products at any time, and is not limited to providing input at this step in method 100. Again, making a comparison between the existing product and replacement product(s) may be as simple as comparing a ratio of outputs to inputs (e.g., light output to power consumed) or may be as complex as considering existing warranty, capital costs, training costs, and the like. If desired, the calculations necessary for an adequate comparison can be incorporated into software that is accessible to the user such that an economic analysis can be performed on demand, preferably as part of webpage 300. Some possible models/equations for comparing two products are discussed in IESNA publication RP-31-96 Recommend Practice for the Economic Analysis of Lighting (e.g., pages 1-12) incorporated by reference herein.

One unique characteristic of LED luminaires is that the LED light sources are typically mounted to a circuit board and integral to the luminaire and thus, are not easily replaced (at least not individually); this is unlike conventional light sources that insert into a light socket and so are easily replaced. This characteristic may need to be taken into consideration, for example, when determining maintenance costs. There is no maintenance of LED light sources per se but the entire array of LEDs may need to be replaced if some unacceptable number of them (e.g., 35%) fail. In comparison, there may be some maintenance costs associated with more traditional light sources (e.g., the cost to elevate a worker to the location of each luminaire for cleaning the lens), but the cost may be justified since only a single light source needs replacing upon failing. This is but one consideration when comparing operation of an existing product to replacement products (or upgrading/repairing the existing product).

If the comparison between the existing product and the proposed replacement product shows a replacement product may be favorable at some point in time, then a new life span is predicted and proximity to any established EOL conditions reported (reference no. 196). For the present system, it is assumed that the product is fairly new and efficient, and no replacement products would lower the operating cost in the foreseeable future (reference no. 194).

e) User Reporting (107) According to the preferences the user established on webpage 300, the third party provides a report which may include how method 100 was enacted, any new projections for life span, proximity to EOL condition(s), recommendations for new operating conditions, and the like; again, the level of detail is user-defined (preferably prior to enacting method 100). As one option, the user could access the report online via a website which hosts both webpage 300 and the interface which allows the user to communicate on/off schedules to remote central control center 250. Of course, other delivery methods are possible, and envisioned. The report could include data and/or information not gathered in method 100; for example, the report could include the location of the lighting system, a list of on-site equipment (e.g., number of poles, luminaires, etc.), the initial operating conditions, any relevant governing codes or equipment ratings, or warranty information.

For the lighting system illustrated in FIGS. 5A-D, consider the case where it has been established that neither the product EOL nor the economic EOL has been met, it is not economically feasible to replace the product, and the operating conditions have changed since the last status assessment. Thus, an appropriate report—particularly if the user specified "summary" in field 304 of webpage 300—may include information related to the lighting system (e.g., so to readily identify which lighting system is being reported on if the user has multiple lighting systems at a single site), a comparison of the data to the EOL conditions (see reference no. 162), and a new life span projection based on the new operating conditions (see reference no. 164). Other information could be included; for example, if the efficacy of each luminaire was calculated (according to well-known methods in the art) and one was found to be low, that luminaire could be identified so the user could perform diagnostics. As another example, if power consumption was measured at multiple points in the circuit, the third party could identify the component drawing the most power so the user could consider replacing that portion of the product. As yet another example, the third party could plot light output readings versus operating time so the user could better tailor on/off schedules.

f) Optional Alert (108)

If desired, an alert system could be installed on-site, either during initial installation or at some other time. FIG. 6 illustrates one example of an alarm system which could be installed at pole 204 and in enclosure 212. As can be seen from FIG. 6, the alarm system comprises a long range visual alert 236 (e.g., a relatively large light that can be seen from substantial distances, e.g., at least hundreds of feet), a short range visual alert 230 (e.g., a relatively small light that can be seen within a few feet or yards), and a display panel 231 (e.g., an LCD display which could be viewed at or near box 212 and could have adjustable text and graphics). The user may define (e.g., via webpage 300) the use of the alert system illustrated in FIG. 6, if desired.

Assume, for example, that during method 100 it was found that the economic EOL was reached (e.g., system efficacy fell below the user-defined threshold). The user may determine that reaching an economic EOL condition is not critical to indicate on-site (e.g., because decisions regarding the cost-effectiveness of the product are made at a remotely located corporate office) and so the alert system may not be activated. Alternatively, the visual indicators might not be activated but display 231 could include a message 234 which indicates the EOL condition has been reached. If display 231 is not large enough to display the full message, the message may be scrolled or a code may be displayed which corresponds to some known message. As another alternative, both visual indicators could illuminate but display 231 not activate; these alerts could flash according to some known pattern to indicate the specific alert, if desired.

Other features of the alert system could include an audible alert or some change to the operation of the product. For example, control center 250 could send a command to control unit 240 to dim LEDs 24 over a period of time. The reduced light output level could be sustained for a given length of time and then returned to the normal output. The length of time could be on the order of several seconds or a few minutes. Alternatively, the lights could be completely powered down; a message 234 could indicate how to override the shutdown. For the system illustrated in FIGS. 5A-D, if the economic EOL condition has been reached, control center 250 could send a command to control unit 240 to switch from constant light mode to constant wattage mode (e.g., so as not to further decrease efficacy). If the lighting system remains in constant wattage mode, then the light output will diminish over time as the light sources continue to degrade, also providing a visual alert.

D. Options and Alternatives

The invention may take many forms and embodiments. The foregoing examples are but a few of those. To give some sense of some options and alternatives, a few examples are given below.

Numerous references are made herein to the user of the product, the manufacturer of the product, and a third party which enacts method 100. It is of note not all three entities need exist to practice the invention, nor do all three need to be separate entities. For example, the third party and the manufacturer of the product could be the same entity. As another example, the third party could communicate with the user with no input from the manufacturer. Further, all three entities need not provide the various information, data, and inputs described herein. For example, the manufacturer and the third party could establish all end-of-life conditions without input from the user. As another example, the user and some unrelated party could provide input when comparing the current product to potential replacement products. The extent to which method 100 is user-driven depends on the nature of the product and the preference of the user, to name two considerations.

Described herein is an exemplary lighting system; this system is but one example of a product to which method 100 could be applied. Aspects of the present invention could be applied to a variety of products and/or systems, including lighting systems which differ from that described herein. For example, aspects according to the present invention could be applied to a lighting system similar to that illustrated in FIGS. 5A-D but without remote central control center 250 or remote control capability, using metal halide light sources instead of LED light sources, or including some other difference.

The wealth of information collected via method 100 may be used for purposes other than those described herein. For example, data taken over time and over a range of operating conditions may reveal an optimal setting. If an EOL condition is reached and it is in accordance with the user's preferences, control unit 240 could automatically change the operating conditions to the optimal setting until the next reporting cycle, for example. As another example, the comparisons of operating the existing product to potential replacement products could serve as a technology watchlist for the user to help identify the most relevant emerging technologies.

What is claimed is:

1. An apparatus for monitoring an electrically powered system comprising:
    a. at least one electrically powered component in a circuit in operative connection to an electrical power source;
    b. a processor;
    c. a user input associated with the processor adapted to modify information stored in a digital memory which includes information relating to at least one operating factor and at least one economic factor of the component or electrically powered system;
    d. a program associated with the processor which includes a first defined end of life condition for the component based on the at least one operating factor and a second defined end of life condition for the component based on the least one economic factor, the program adapted to modify either or both of the first and second defined end of life conditions based on user inputted changes to the information;
    e. at least one sensor providing a sensor output related to a said operating factor or economic factor;
    f. the program comparing at least one of the information and the sensor output to at least one of the first and second defined end of life conditions and, if indicated, taking an action based on the comparison;
    g. so that an indicated action based on monitoring for a user inputted and updatable end of life condition can be provided for the system.

2. The apparatus of claim 1 wherein the electrically powered system is a lighting system and the electrically powered component is a light source.

3. The apparatus of claim 2 wherein the lighting system is a wide area lighting system.

4. The apparatus of claim 3 wherein the light source is HID or solid.

5. The apparatus of claim 4 wherein the end of life condition based on the at least one operating factor comprises one or more of:
    a. operational failure of the light source; and
    b. lack of useful operation of the light source.

6. The apparatus of claim 5 wherein lack of useful operation of the light source comprises light output under a threshold level.

7. The apparatus of claim 4 wherein the end of life condition based on the at least one economic factor comprises one or more of:
    a. a threshold cost of operating the system;
    b. a threshold cost of operating the light source;
    c. a threshold cost of repair of the light source; and
    d. a threshold cost of replacement of the light source with the same or different light source.

8. The apparatus of claim 4 wherein the information related to a said operating factor or economic factor comprises one or more of:
    a. rated light output of the light source;
    b. rated operating power for the light source;
    c. rated lamp lumen depreciation for the light source;
    d. rated life span for the light source;
    e. cost of energy consumed by the light source;
    f. cost of replacement or repair of the light source with the same light source;
    g. cost of replacement of the light source with a different light source;
    h. labor and resource cost for maintenance of the light source;
    i. possible replacement components;
    j. material change in temperature at or near the light source;
    k. level of operating power to the light source; and
    l. ambient or environmental conditions around the light source.

9. The apparatus of claim 8 wherein the information is:
    a. obtained from a third party;
    b. obtained by empirical testing.

10. The apparatus of claim 4 wherein the sensor output comprises:
    a. light output from the light source by a light level sensor;
    b. power consumed by the light source by a sensor operatively connected to the circuit; or
    c. cumulative hours of operation by a timer.

11. The apparatus of claim 4 wherein the action comprises a report based on the comparison.

12. The apparatus of claim 11 wherein the report comprises:
    a. a posting accessible via a web site; and/or
    b. a message sent to a recipient.

13. The apparatus of claim 4 wherein the action comprises an alert based on the comparison.

14. The apparatus of claim 13 wherein the alert comprises:
   a. an auditory or visible signal perceivable over a substantial area at and around the system;
   b. an auditory or visible signal perceivable at or near the system or component;
   c. a textual or graphic display at or near the system or component; or
   d. a textual or graphic message to a remote location.

15. The apparatus of claim 1 wherein the comparison can be periodic, discretionary, or essentially continuous.

16. The apparatus of claim 1 wherein the action can be periodic, discretionary, or essentially continuous.

17. The apparatus of claim 1 wherein the comparison is performed each time an end of life condition is redefined.

18. A method of assessing the life span of a product or system comprising:
   a. establishing one or more metrics for evaluating performance of the product or system;
   b. processing, calculating, or gathering data relevant to the one or more metrics at a set of operating conditions;
   c. predicting an initial end of the life span of the product or system at the set of operating conditions;
   d. evaluating the data to determine proximity to one or more predefined thresholds related to the one or more metrics; and
   e. taking separate actions based on the evaluation of step d wherein:
      i. if the data exceeds at least one of said one or more predefined thresholds, the action comprises:
         1. comparing cost to bring the product or system into conformity with the one or more predefined thresholds at said set of operating conditions with cost to replace the product or system; and
         2. if the cost to replace the product or system is less than the cost to bring the product or system into the conformity, predict a new end of the life span of the product or system at the set of operating conditions; and
      ii. if the data does not exceed at least one of said one or more predefined thresholds, the action comprises estimating proximity to the initial predicted end of the life span of the product or system at the set of operating conditions.

19. The method of claim 18 wherein the initial end of the life span of the product or system comprises a failure of one or more components of the product or the system.

20. The method of claim 18 wherein the one or more predefined thresholds comprise one or more of:
   a. a metric value;
   b. an operational limit of the product or system;
   c. a ratio of metric values; or
   d. a trend in the data.

21. The method of claim 18 further comprising visually or audibly indicating the proximity to the end of the life span of the product or system at or near the product or system.

22. The method of claim 18 further comprising repeating steps b-e for additional sets of operating conditions.

* * * * *